US012789664B2

(12) United States Patent
Koh

(10) Patent No.: US 12,789,664 B2
(45) Date of Patent: Nov. 10, 2026

(54) ELECTRICAL ENERGY SUPPLY SYSTEM, NON-TRANSIENT COMPUTER-READABLE MEDIUM AND CHARGING METHOD FOR ELECTRIC VEHICLES

(71) Applicant: Prime Planet Energy & Solutions, Inc., Tokyo (JP)

(72) Inventor: Hideki Koh, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 45 days.

(21) Appl. No.: 18/937,887

(22) Filed: Nov. 5, 2024

(65) Prior Publication Data

US 2025/0153592 A1 May 15, 2025

(30) Foreign Application Priority Data

Nov. 9, 2023 (JP) ................................. 2023-191335

(51) Int. Cl.
*B60L 53/00* (2019.01)
*B60L 53/51* (2019.01)
*B60L 53/62* (2019.01)

(52) U.S. Cl.
CPC ............... *B60L 53/62* (2019.02); *B60L 53/51* (2019.02)

(58) Field of Classification Search
CPC .... B60L 53/62; B60L 53/51; B60L 2240/662; B60L 2240/80; B60L 2260/52;
(Continued)

(56) References Cited

U.S. PATENT DOCUMENTS 9,148,027 B2 9/2015 Shane et al.
2011/0202221 A1* 8/2011 Sobue .................... B60K 16/00 701/22

(Continued)

FOREIGN PATENT DOCUMENTS

JP 2010231258 A * 10/2010
JP 2012-147651 A 8/2012

(Continued)

*Primary Examiner* — Peter D Nolan
*Assistant Examiner* — Peter Y Ning
(74) *Attorney, Agent, or Firm* — Finnegan, Henderson, Farabow, Garrett and Dunner, LLP

(57) ABSTRACT

An electrical energy supply system includes a photovoltaic power generation device, charging devices that charge on-vehicle batteries of electric vehicles with electrical energy generated by the photovoltaic power generation device, an electrical energy generation amount prediction unit that predicts an electrical energy generation amount by the photovoltaic power generation device, a residual amount acquisition unit that acquires a residual electrical energy amount of each of the on-vehicle batteries, a travel schedule acquisition unit that acquires a travel schedule of each of the electric vehicles, and a plan creation unit that, based on the predicted electrical energy generation amount, the residual electrical energy amount of each of the on-vehicle batteries, and the travel schedule of each of the electric vehicles, creates a distribution plan when each of the electric vehicles is charged with the electrical energy generated by the photovoltaic power generation device.

9 Claims, 3 Drawing Sheets

(58) Field of Classification Search
CPC .. B60L 2260/54; B60L 2260/58; B60L 53/63; B60L 53/66; B60L 53/67; B60L 53/68; B60L 58/12; B60L 53/60; H01M 10/44; H01M 2220/20; H02J 7/35; H02J 3/003; H02J 3/004; H02J 2101/24; H02S 40/38; Y02T 10/70; Y02T 10/7072; Y02T 90/12; B60Y 2200/91; Y02E 10/50
See application file for complete search history.

(56) References Cited

U.S. PATENT DOCUMENTS

| | | | | |
|---|---|---|---|---|
| 2012/0161692 | A1* | 6/2012 | Kobayashi | B60L 58/13 320/109 |
| 2014/0028254 | A1* | 1/2014 | Shane | B60L 3/12 320/109 |
| 2015/0042278 | A1* | 2/2015 | Leary | B60L 1/02 901/30 |
| 2019/0193573 | A1* | 6/2019 | Iwai | B60L 53/66 |
| 2024/0010087 | A1* | 1/2024 | Atlasman | B60L 53/305 |

FOREIGN PATENT DOCUMENTS

| | | | | |
|---|---|---|---|---|
| JP | 2013099140 | A | * | 5/2013 |
| JP | 5472069 | B | | 4/2014 |
| JP | 2016134160 | A | * | 7/2016 |
| JP | 7341006 | B2 | * | 9/2023 |

* cited by examiner

ELECTRICAL ENERGY SUPPLY SYSTEM, NON-TRANSIENT COMPUTER-READABLE MEDIUM AND CHARGING METHOD FOR ELECTRIC VEHICLES

CROSS-REFERENCE TO RELATED APPLICATIONS

This application claims the benefit of priority to Japanese Patent Application No. 2023-191335 filed on Nov. 9, 2023. The entire contents of this application are incorporated herein by reference.

BACKGROUND

The present disclosure relates to an electrical energy supply system, a non-transient computer-readable medium that records a computer program for operating the electrical energy supply system, and a charging method for electric vehicles.

For example, Japanese Patent No. 5472069 discloses a charging control device that controls charging of a plug-in electric vehicle on which a battery is mounted. The charging control device according to Japanese Patent No. 5472069 is configured to switch between electrical energy supply from a commercial electrical energy source to the plug-in electric vehicle and electrical energy supply from an electrical energy source based on photovoltaic power generation to the plug-in electric vehicle. The charging control device is configured to calculate the necessary electrical energy amount on the basis of input information about a destination, and the like, and calculate the amount of electrical energy generated by the photovoltaic power generation on the basis of information including the weather, sunrise and sunset times, and the like, so that charging for the deficiency is covered by the commercial electrical energy source.

Japanese Patent Application Publication No. 2010-231258 discloses a battery charging system that creates a charging schedule for a plurality of electric vehicles. The system according to Japanese Patent Application Publication No. 2010-231258 is configured to adjust each schedule by combining the charging schedules and vehicle operating schedules for the respective electric vehicles.

Japanese Patent Application Publication No. 2012-147651 discloses a charging control system for charging a plurality of electric vehicles, in which an electric vehicle whose charging level is lower than a charging level necessary for the vehicle to travel a minimum usable distance is charged with priority. The charging system according to Japanese Patent Application Publication No. 2012-147651 charges with priority the electric vehicle that reaches the charging level early among the plurality of electric vehicles. According to Japanese Patent Application Publication No. 2012-147651, setting the priority in this manner makes it possible for a business operator to increase the operation rate of the electric vehicles.

SUMMARY

Here, it is an object to provide an electrical energy supply system that can charge a plurality of electric vehicles at the same time with electrical energy generated by a photovoltaic power generation device, in which the electrical energy generated by the photovoltaic power generation device is used efficiently.

An electrical energy supply system suggested here includes: a photovoltaic power generation device; charging devices each of which is connected to the photovoltaic power generation device, is configured to be connectable to an electric vehicle with an on-vehicle battery mounted thereon, and charges the on-vehicle battery of the connected electric vehicle with electrical energy generated by the photovoltaic power generation device; an electrical energy generation amount prediction unit that predicts an electrical energy generation amount generated by the photovoltaic power generation device; a residual amount acquisition unit that acquires a residual electrical energy amount of the on-vehicle battery in each of the electric vehicles; a travel schedule acquisition unit that acquires a travel schedule of each of the electric vehicles; a plan creation unit that, based on the electrical energy generation amount predicted by the electrical energy generation amount prediction unit, the residual electrical energy amount of each of the on-vehicle batteries acquired by the residual amount acquisition unit, and the travel schedule of each of the electric vehicles acquired by the travel schedule acquisition unit, creates a distribution plan when the on-vehicle battery of each of the electric vehicle is charged with the electrical energy generated by the photovoltaic power generation device; and a charging control unit that controls the charging devices to charge the electric vehicles based on the distribution plan created by the plan creation unit.

By the electrical energy supply system described above, the electrical energy generated by the photovoltaic power generation device can be distributed to each of the electric vehicles as planned, based on the prediction of the electrical energy generation amount by the photovoltaic power generation device, the residual electrical energy amount of each of the on-vehicle batteries, and the travel schedule of each of the electric vehicles. Therefore, the electrical energy generated by the photovoltaic power generation device can be used efficiently.

A non-transient computer-readable medium suggested here records a computer program configured to cause a computer to perform: ordering a charging devices each of which is configured to be connectable to an electric vehicle with an on-vehicle battery mounted thereon and is connected to a photovoltaic power generation device, to charge the on-vehicle battery of the connected electric vehicle with electrical energy generated by the photovoltaic power generation device; predicting an electrical energy generation amount generated by the photovoltaic power generation device; acquiring a residual electrical energy amount of the on-vehicle battery in each of electric vehicles; acquiring a travel schedule of each of the electric vehicles; and creating a distribution plan when the on-vehicle battery of each of the electric vehicles is charged with the electrical energy generated by the photovoltaic power generation device based on the predicted electrical energy generation amount, the acquired residual electrical energy amount of each of the on-vehicle batteries, and the acquired travel schedule of each of the electric vehicles.

A method for charging electric vehicles suggested here is a method for charging on-vehicle batteries of electric vehicles by charging devices connected to a photovoltaic power generation device and includes: predicting an electrical energy generation amount generated by the photovoltaic power generation device; acquiring a residual electrical energy amount of the on-vehicle battery in each of the electric vehicles; acquiring a travel schedule of each of the electric vehicles; creating a distribution plan when the on-vehicle battery of each of the electric vehicles is charged with the electrical energy generated by the photovoltaic power generation device based on the predicted electrical energy generation amount, the acquired residual electrical energy amount of each of the on-vehicle batteries, and the acquired travel schedule of each of the electric vehicles, and charging the electric vehicles, based on the distribution plan.

By the non-transient computer-readable medium and the charging method described above, the effect similar to that of the electrical energy supply system described above can also be obtained.

DETAILED DESCRIPTION

One embodiment of an electrical energy supply system disclosed herein is described below with reference to the drawings. The embodiment described here is not intended to limit the present disclosure in particular as a matter of course. The present disclosure is not limited to the embodiments described here unless otherwise stated in particular. The members and parts with the same operation are denoted by the same reference sign as appropriate and the overlapping description is omitted as appropriate.

[Structure of Electrical Energy Supply System]

Figure 1:
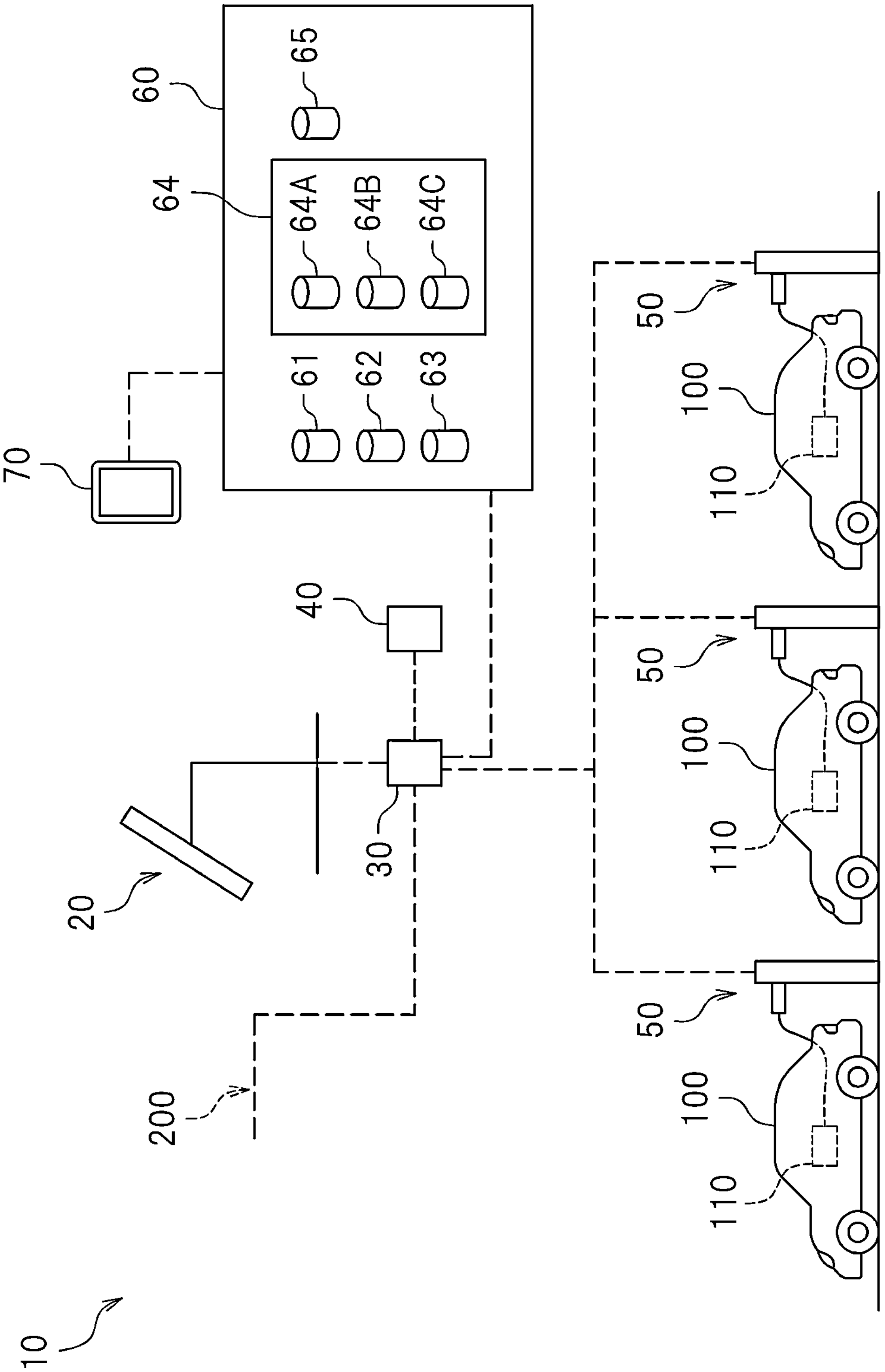
FIG. 1 is a conceptual diagram illustrating an electrical energy supply system.

FIG. 1 is a conceptual diagram illustrating an electrical energy supply system 10 according to one embodiment. As illustrated in FIG. 1, the electrical energy supply system 10 according to this embodiment includes a photovoltaic power generation device 20, an electrical energy conversion device 30, an electrical energy storage device 40, a plurality of charging devices 50 to each of which an electric vehicle 100 is connected, a control device 60, and a terminal 70 to check the state of the electrical energy supply system 10. The electrical energy supply system 10 is connected to a commercial electrical energy supply system 200 (hereinafter referred to the commercial system 200).

The electrical energy supply system 10 is a system for charging the plurality of electric vehicles 100 for delivery owned by a delivery business operator, for example. However, the electric vehicle 100 to be charged by the electrical energy supply system 10 is not limited to the electric vehicle for delivery and may be, for example, a rental car to be rented to a customer by a rental car business operator, a company electric vehicle owned by a company, or the like. The electric vehicle 100 has an on-vehicle battery 110 mounted thereon. The on-vehicle battery 110 includes an electrical energy storage device, for example a lithium ion secondary battery. However, the electrical energy storage device included in the on-vehicle battery 110 is not limited to the lithium ion secondary battery. The electric vehicle 100 may include general vehicles using electrical energy as an energy source, for example an electric vehicle, a hybrid electric vehicle, a plug-in hybrid electric vehicle, and the like. The electric vehicle 100 may be a four-wheeled vehicle or a two-wheeled vehicle.

Each of the plurality of charging devices 50 is connected to the photovoltaic power generation device 20 through the electrical energy conversion device 30. Each of the plurality of charging devices 50 is configured to be connectable to the electric vehicle 100 with the on-vehicle battery 110 mounted thereon. Each charging device 50 charges the on-vehicle battery 110 of the connected electric vehicle 100 with the electrical energy generated by the photovoltaic power generation device 20. The electrical energy conversion device 30 converts the electrical energy generated by the photovoltaic power generation device 20 into the form that can be stored in the on-vehicle battery 110.

The electrical energy storage device 40 is connected to the electrical energy conversion device 30 and can store the electrical energy generated by the photovoltaic power generation device 20. The electrical energy conversion device 30 is also connected to the commercial system 200. The electrical energy conversion device 30 feeds the surplus electrical energy out of the electrical energy generated by the photovoltaic power generation device 20 back to the commercial system 200. If the electrical energy generated by the photovoltaic power generation device 20 is insufficient, the electrical energy conversion device 30 supplies the electrical energy supplied from the commercial system 200 to the electric vehicle 100 or stores the electrical energy in the electrical energy storage device 40.

The control device 60 controls the electrical energy conversion device 30 to charge the electric vehicle 100 with the electrical energy from the photovoltaic power generation device 20 or the commercial system 200. When there is a surplus in electrical energy generated by the photovoltaic power generation device 20, the control device 60 controls the electrical energy conversion device 30 to feed the surplus electrical energy back to the commercial system 200. As illustrated in FIG. 1, the control device 60 includes an electrical energy generation amount prediction unit 61, a residual amount acquisition unit 62, a travel schedule acquisition unit 63, a plan creation unit 64, and a charging control unit 65. The control device 60 has a computer program installed therein, allowing a computer to execute these processing units. The control device 60 controls the electrical energy supply system 10 in accordance with the computer program. The computer program may be recorded in a non-transient computer-readable medium, for example. Examples of the non-transient computer-readable medium include magnetic recording media (for example, flexible disk, magnetic tape, and hard disk drive), a CD-ROM (read only memory), and the like.

A server of the control device 60 is provided at an external server installation place in this embodiment. Functions of the control device 60 may be performed by a computer on a cloud. A part or all of the functions of the control device 60 may be performed by an equipment placed in an office or the like where the charging devices 50 are provided. The installation place and mode of the control device 60 are not limited in particular.

The electrical energy generation amount prediction unit 61 predicts the electrical energy generation amount by the photovoltaic power generation device 20. More specifically, the electrical energy generation amount prediction unit 61 acquires weather forecast information, and predicts the electrical energy generation amount by the photovoltaic power generation device 20 on the basis of the acquired weather forecast information. The electrical energy generation amount by the photovoltaic power generation device 20 is large when it is sunny with a large amount of solar radiation and is small when it is cloudy with a small amount of solar radiation or at night. Here, the electrical energy generation amount prediction unit 61 estimates the electrical energy generation amount by the photovoltaic power generation device 20 for each period of time, on the basis of the weather forecast information for each period of time.

The residual amount acquisition unit 62 acquires the residual electrical energy amount of the on-vehicle battery 110 in each electric vehicle 100. Here, the residual amount acquisition unit 62 acquires the residual electrical energy amount of the on-vehicle battery 110 connected to the charging device 50 through the charging device 50. The charging device 50 includes a vehicle specifying device that specifies the connected electric vehicle 100, and an electrical energy amount acquisition device that acquires the residual electrical energy amount of the on-vehicle battery 110 (neither device is illustrated).

The travel schedule acquisition unit 63 acquires the travel schedule of each electric vehicle 100. Although a method of acquiring the travel schedule is not limited in particular, the travel schedule acquisition unit 63 according to this embodiment acquires a delivery schedule including a delivery destination of a delivery object and the electric vehicle 100 used for the delivery from a computer, which is not illustrated, that manages the delivery schedule. The travel schedule acquisition unit 63 calculates the scheduled travel distance of each electric vehicle 100 from the acquired delivery schedule. From the scheduled travel distance of each electric vehicle 100, the travel schedule acquisition unit 63 calculates a necessary electrical energy storage amount Vn (see FIG. 3) that needs to be stored in the on-vehicle battery 110 when each electric vehicle 100 departs.

Based on the electrical energy generation amount predicted by the electrical energy generation amount prediction unit 61, the residual electrical energy amount of each on-vehicle battery 110 acquired by the residual amount acquisition unit 62, and the travel schedule of each electric vehicle 100 acquired by the travel schedule acquisition unit 63, the plan creation unit 64 creates a distribution plan when the on-vehicle battery 110 of each electric vehicle 100 is charged with the electrical energy generated by the photovoltaic power generation device 20. Here, the plan creation unit 64 predicts the electrical energy amount necessary to charge the on-vehicle battery 110 of each electric vehicle 100 to perform the travel schedule, and creates a distribution plan to maximize the number of electric vehicles 100 whose on-vehicle batteries 110 are charged with an electrical energy amount equal to or more than the predicted electrical energy amount before the scheduled use start time. Thus, the plan creation unit 64 makes as many electric vehicles 100 as possible ready to operate.

The plan creation unit 64 may create the distribution plan of the electrical energy by the photovoltaic power generation device 20 using, for example, a linear programming method, genetic algorithm, adaptive moment estimation (Adam), or other method.

The plan creation unit 64 includes a first plan creation unit 64A, a determination unit 64B, and a second plan creation unit 64C. The first plan creation unit 64A creates a distribution plan to charge the on-vehicle battery 110 of each electric vehicle 100 in the range of less than or equal to a standard electrical energy storage amount Vs (see FIG. 3) that is smaller than the electrical energy storage amount in a fully charged state. The standard electrical energy storage amount Vs is the upper limit value of the electrical energy storage amount in a normal state. Here, the standard electrical energy storage amount Vs is the ratio (%) to the electrical energy storage amount in the fully-charged state, which is so-called state of charge (SOC). The on-vehicle battery 110 deteriorates more if the fully-charged state or the state close to the fully-charged state (hereinafter also referred to as "the state close to the fully-charged state" simply) continues. From the viewpoint of the lifetime of the on-vehicle battery 110, it is desirable that the on-vehicle battery 110 be not in the state close to the fully-charged state. In this embodiment, the standard electrical energy storage amount Vs of each of the on-vehicle batteries 110 is set in accordance with the kind, specification, years of use, and the like of the on-vehicle battery 110.

Based on the electrical energy generation amount predicted by the electrical energy generation amount prediction unit 61, the determination unit 64B determines whether each electric vehicle 100 can travel according to the travel schedule when the electrical energy is stored in each on-vehicle battery 110 up to the standard electrical energy storage amount Vs. For example, even in a case where the electrical energy storage amount of the on-vehicle battery 110 is set to the standard electrical energy storage amount Vs by the previous day, if it is predicted that the predicted electrical energy generation amount on that day is small or the predicted electrical energy consumption amount (travel distance) is large and the on-vehicle battery 110 cannot be charged with the electrical energy amount enough to travel according to the travel schedule at the scheduled use time of the electric vehicle 100, the determination unit 64B determines that the electric vehicle 100 cannot travel according to the travel schedule.

The second plan creation unit 64C creates a distribution plan to charge the electric vehicle 100 whose travel according to the travel schedule is determined to be impossible by the determination unit 64B, with a preliminary electrical energy storage amount Vt (see FIG. 3) that is larger than the standard electrical energy storage amount Vs and enables the electric vehicle 100 to travel according to the travel schedule. This makes it possible to avoid the inconvenience that the electric vehicle 100 cannot travel according to the travel schedule due to the lack of charging amount of the on-vehicle battery 110. In this case, the second plan creation unit 64C raises the maximum electrical energy storage amount of the on-vehicle battery 110 on the previous day from the standard electrical energy storage amount Vs to the preliminary electrical energy storage amount Vt. Thus, even if the electrical energy generation amount on that day is small or the electrical energy consumption amount is large in the prediction, the electrical energy amount that enables the travel according to the schedule is stored in the on-vehicle battery 110 on the scheduled use time of the electric vehicle 100. Such a setting change decreases the necessity of compensating the lack of electrical energy from the commercial system 200 on that day.

In a case where the predicted atmospheric temperature at the scheduled use start time of each electric vehicle 100 is higher than a predetermined reference temperature, the plan creation unit 64 sets the scheduled charge end time for the scheduled use start time so as to be earlier than in a case where the predicted atmospheric temperature is lower than a predetermined reference temperature, in consideration of the lifetime of the on-vehicle battery 110. When the atmospheric temperature is high, it is preferable to use the electric vehicle 100 after the charged on-vehicle battery 110 is cooled. When the atmospheric temperature is high, it takes long to cool the on-vehicle battery 110. On the contrary, when the atmospheric temperature is low, it may be preferable to use the electric vehicle 100 before the charged on-vehicle battery 110 is cooled. Even in the case where it is preferable to use the cooled on-vehicle battery 110, it takes short to cool when the atmospheric temperature is low.

The charging control unit 65 controls the plurality of charging devices 50 so as to charge the plurality of electric vehicles 100 on the basis of the distribution plan set by the plan creation unit 64.

The terminal 70 is connected to the control device 60 and is configured to be able to check the state of each unit of the electrical energy supply system 10 and the prediction results. The terminal 70 may be placed in an office or may be carried by a user of the electrical energy supply system 10 (for example, a delivery person at a delivery company). The terminal 70 may be either a dedicated operation terminal or a general terminal in which an application is installed, for example a smartphone or the like. The terminal 70 may enable not just checking of the state of the electrical energy supply system 10 or the like but also operation or setting change of the electrical energy supply system 10 (for example, change of standard electrical energy storage amount Vs or the like).

[Operation of Electrical Energy Supply System]

[Case in which Predicted Electrical Energy Generation Amount is Over Predicted Use Amount]

Figure 2:
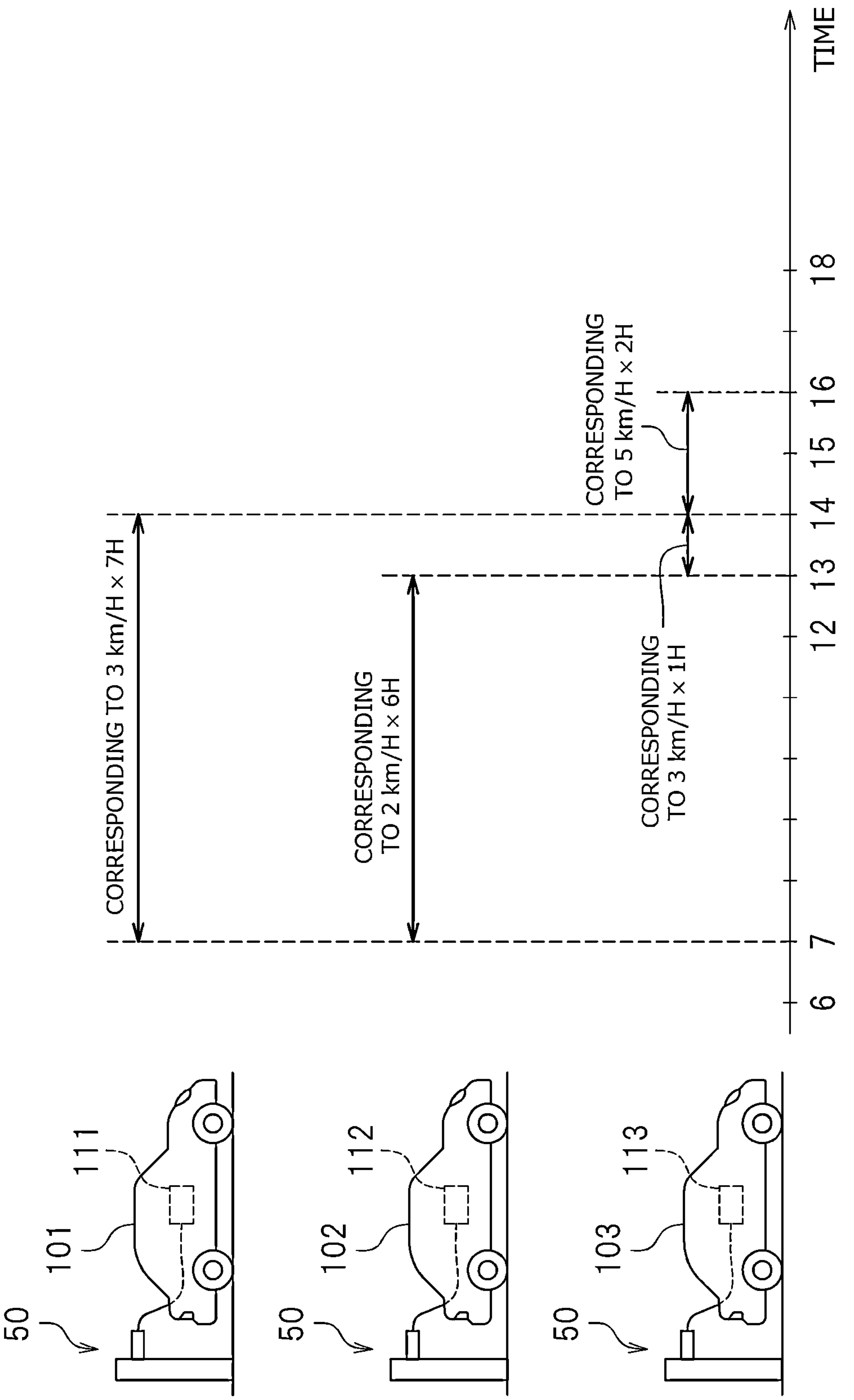
FIG. 2 is a schematic diagram illustrating one example of a distribution plan.

One example of an operation of the electrical energy supply system 10 on the day when the on-vehicle battery 110 can be charged with just the electrical energy generated by the photovoltaic power generation device 20 will be described below first. FIG. 2 is a schematic diagram illustrating one example of a distribution plan. In the example illustrated in FIG. 2, the plurality of electric vehicles 100 include three electric vehicles 101, 102, and 103, and three or more charging devices are provided as the charging devices 50 so that the electric vehicles 101, 102 and 103 can be charged at the same time.

In this example, it is assumed that the scheduled use start time of the first electric vehicle 101 is 14:00, the scheduled use start time of the second electric vehicle 102 is 15:00, and the scheduled use start time of the third electric vehicle 103 is 16:00. Moreover, it is assumed that each of the residual electrical energy amount of an on-vehicle battery 111 of the first electric vehicle 101, the residual electrical energy amount of an on-vehicle battery 112 of the second electric vehicle 102, and the residual electrical energy amount of an on-vehicle battery 113 of the third electric vehicle 103 corresponds to a travel distance of 10 km. Furthermore, it is assumed that the scheduled travel distance of the first electric vehicle 101 is 30 km, the scheduled travel distance of the second electric vehicle 102 is 20 km, and the scheduled travel distance of the third electric vehicle 103 is 20 km. It is assumed that the predicted electrical energy generation amount by the photovoltaic power generation device 20 corresponds to 5 km per hour and the charging can start from 7:00.

Under the aforementioned conditions, the plan creation unit 64 creates a distribution plan as illustrated in FIG. 2, for example. As illustrated in FIG. 2, the electrical energy corresponding to 3 km per hour is supplied to the first electric vehicle 101 for seven hours from 7:00 according to the distribution plan. Thus, at 14:00, which is the scheduled use start time of the first electric vehicle 101, the first electric vehicle 101 is charged with the electrical energy corresponding to 21 km. By this charging, the first electric vehicle 101 is charged with the electrical energy corresponding to 31 km in combination with the residual electrical energy before the charging. Therefore, the first electric vehicle 101 can travel 30 km, which is the travel distance according to the travel schedule.

As illustrated in FIG. 2, the electrical energy corresponding to 2 km per hour is supplied to the second electric vehicle 102 for six hours from 7:00. Thus, the second electric vehicle 102 is charged with the electrical energy corresponding to 12 km at the time of 13:00, two hours before 15:00 that is the scheduled use start time of the second electric vehicle 102. By this charging, the second electric vehicle 102 is charged with the electrical energy corresponding to 22 km in combination with the residual electrical energy before the charging. Therefore, the second electric vehicle 102 can travel 20 km corresponding to the travel distance according to the travel schedule.

As illustrated in FIG. 2, the electrical energy corresponding to 3 km per hour is supplied to the third electric vehicle 103 for one hour from 13:00 at which the charging of the second electric vehicle 102 ends. In addition, the electrical energy corresponding to 5 km per hour is supplied for two hours from 14:00 at which the charging of the first electric vehicle 101 also ends. Thus, at 16:00 that is the scheduled use start time of the third electric vehicle 103, the third electric vehicle 103 is charged with the electrical energy corresponding to 13 km. By this charging, the third electric vehicle 103 is charged with the electrical energy corresponding to 23 km in combination with the residual electrical energy before the charging. Therefore, the third electric vehicle 103 can travel 20 km corresponding to the travel distance according to the travel schedule.

By acquiring the predicted electrical energy generation amount by the photovoltaic power generation device 20 and the travel schedule and the residual electrical energy amount of the electric vehicles 101 to 103, such a distribution plan can be created. As a result, in this example, all the electric vehicles 101 to 103 can be charged with the electrical energy that can keep to the travel schedule. If the travel schedule and the residual electrical energy amount of the electric vehicles 101 to 103 are not acquired, all the electric vehicles 101 to 103 need to be charged excessively. In such a case, it may be necessary that a part of or all the electric vehicles 100 are charged with the electrical energy from the commercial system 200.

With the distribution plan described above, moreover, the deterioration of the on-vehicle batteries 111 to 113 by quick charging can be suppressed. Furthermore, according to the distribution plan, the time after the end of the charging and before the start of use (the time corresponding to cooling time for the on-vehicle battery 110) can be secured for more electric vehicles 100. The aforementioned example is a simplified example and as long as there is a surplus in supply electrical energy, adjusting the charging amount per unit time for all the electric vehicles 100 can set a predetermined time as the time after the end of the charging and before the start of use.

The time after the end of the charging and before the start of use of the electric vehicles 101 to 103 can be set as appropriate. The aforementioned time may be set longer when the predicted atmospheric temperature at the scheduled use start time of each of the electric vehicles 101 to 103 is higher than a predetermined reference temperature than when the predicted atmospheric temperature is lower. This time may be determined in two stages for the high temperature and for the other cases, for example, or may be determined in three or more stages. More simply, the time may be determined according to the date; for example, the time may be longer during the summer.

[Case in which Predicted Electrical Energy Generation Amount is Below Predicted Use Amount]

Next, one example of the operation of the electrical energy supply system 10 on the day when it is predicted that the charging of the on-vehicle batteries 110 with just the electrical energy generation by the photovoltaic power generation device 20 on that day is impossible (hereinafter also referred to as cloudy day) and on the previous day. In the example to be described below, the on-vehicle battery 110 is charged with the electrical energy over the standard electrical energy storage amount Vs on the previous day, so that the necessary electrical energy on the cloudy day can be secured with just the electrical energy generated by the photovoltaic power generation device 20.

Figure 3:
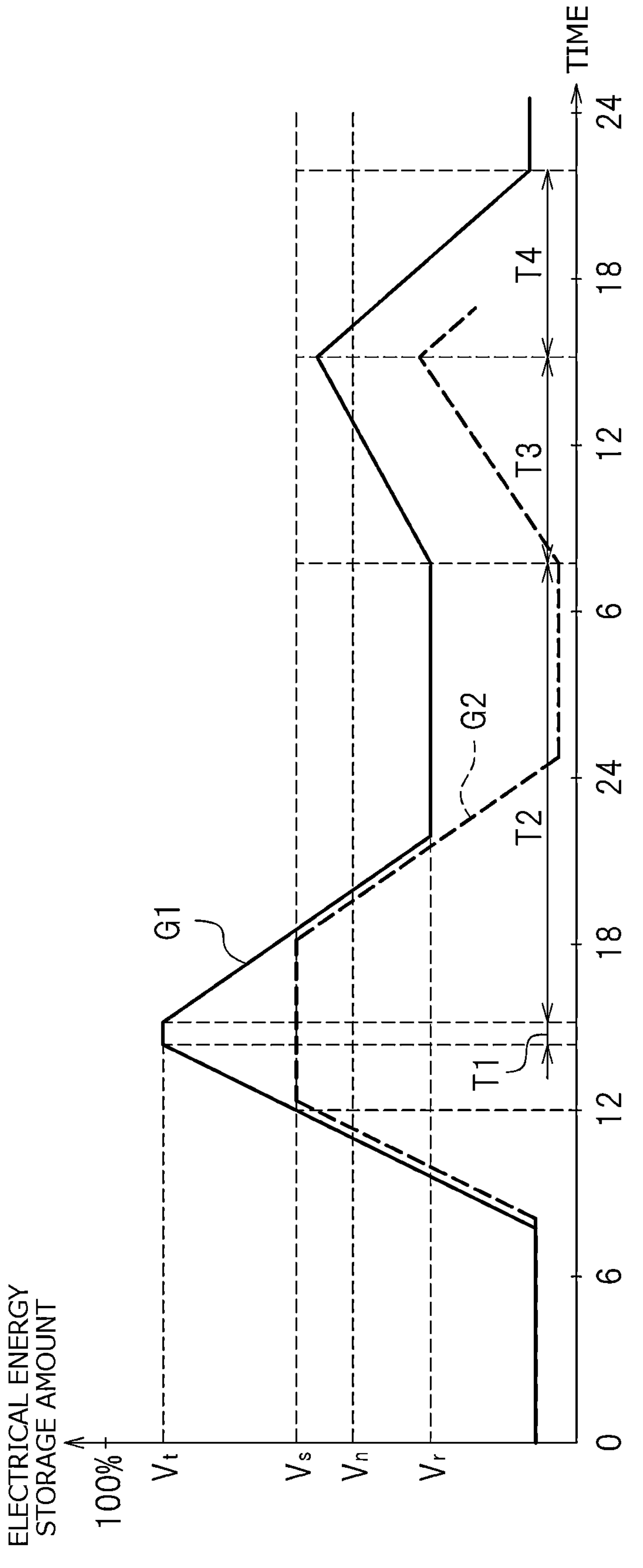
FIG. 3 is a graph expressing in time series the electrical energy storage amount of an on-vehicle battery on a cloudy day and the previous day.

A graph G1 in FIG. 3 is a graph expressing in time series the electrical energy storage amount of the on-vehicle battery 110 on the cloudy day and the previous day. As indicated by the graph G1, in this embodiment, since it is cloudy on that day, the maximum electrical energy storage amount of the on-vehicle battery 110 on the previous day is raised to the preliminary electrical energy storage amount Vt. Thus, the electrical energy storage amount of the on-vehicle battery 110 in the daytime (electrical energy generation possible time) on the previous day is kept at the preliminary electrical energy storage amount Vt (period T1 in FIG. 3). Note that the preliminary electrical energy storage amount Vt can vary depending on the electrical energy generation amount prediction of the photovoltaic power generation device 20 and the travel schedule of the electric vehicle 100. After that, the electrical energy stored in the on-vehicle battery 110 is consumed in a period T2 to become a residual electrical energy storage amount Vr.

Since it is cloudy on the day, the electrical energy storage amount of the on-vehicle battery 110 increases slowly in a period T3; however, since the residual electrical energy storage amount Vr of the on-vehicle battery 110 at the end of the period T2 is large by the setting of the preliminary electrical energy storage amount Vt, the electrical energy storage amount of the on-vehicle battery 110 can reach the necessary electrical energy storage amount Vn that is necessary for the electric vehicle 100 to travel according to the travel schedule before a period T4 in which the electric vehicle 100 is used. For this reason, the electric vehicle 100 can travel as scheduled. In this example, moreover, it is unnecessary to receive the electrical energy supply from the commercial system 200 to enable the electric vehicle 100 to travel according to the travel schedule. A graph G2 indicates the case where the electrical energy storage amount of the on-vehicle battery 110 on the previous day is the standard electrical energy storage amount Vs. As indicated by the graph G2, in the case where the electrical energy storage amount of the on-vehicle battery 110 on the previous day is the standard electrical energy storage amount Vs, the electrical energy amount charged in the on-vehicle battery 110 before the start of the period T4 is below the necessary electrical energy storage amount Vn.

In a case where it is predicted that the electric vehicle 100 can travel according to the travel schedule, the electrical energy supply system 10 sets the upper limit of the electrical energy storage amount of the on-vehicle battery 110 as the standard electrical energy storage amount Vs. Therefore, the deterioration of the on-vehicle battery 110 is suppressed. On the other hand, as described above, in a case where it is predicted that the electric vehicle 100 cannot travel according to the travel schedule, the maximum electrical energy storage amount of the on-vehicle battery 110 is raised to the preliminary electrical energy storage amount Vt.

Effect of Embodiment

An effect that can be obtained by the electrical energy supply system 10 according to this embodiment will hereinafter be described.

The electrical energy supply system 10 according to this embodiment includes: the photovoltaic power generation device 20; the charging devices 50 each of which is connected to the photovoltaic power generation device 20, is configured to be connectable to the electric vehicle 100 with the on-vehicle battery 110 mounted thereon, and charges the on-vehicle battery 110 of the connected electric vehicle 100 with the electrical energy generated by the photovoltaic power generation device 20; the electrical energy generation amount prediction unit 61 that predicts the electrical energy generation amount generated by the photovoltaic power generation device 20; the residual amount acquisition unit 62 that acquires the residual electrical energy amount of the on-vehicle battery 110 in each of the electric vehicles 100; the travel schedule acquisition unit 63 that acquires the travel schedule of each of the electric vehicles 100; the plan creation unit 64 that, based on the electrical energy generation amount predicted by the electrical energy generation amount prediction unit 61, the residual electrical energy amount of each of the on-vehicle batteries 110 acquired by the residual amount acquisition unit 62, and the travel schedule of each of the electric vehicles 100 acquired by the travel schedule acquisition unit 63, creates the distribution plan when the on-vehicle battery 110 of each of the electric vehicles 100 is charged with the electrical energy generated by the photovoltaic power generation device 20; and the charging control unit 65 that controls the charging devices 50 to charge the electric vehicles 100 based on the distribution plan created by the plan creation unit 64.

By the electrical energy supply system 10 as described above, the electrical energy generated by the photovoltaic power generation device 20 can be distributed to each of the electric vehicles 100 as planned, based on the prediction of the electrical energy generation amount by the photovoltaic power generation device 20, the residual electrical energy amount of each of the on-vehicle batteries 110, and the travel schedule of each of the electric vehicles 100. Thus, the electrical energy generated in the photovoltaic power generation device 20 can be used efficiently. For example, as described above, if the travel schedule and the residual electrical energy amount of the electric vehicles 100 are not acquired in advance, all the electric vehicles 100 need to be charged excessively, in which case it is more likely that the electrical energy needs to be supplied from the commercial system 200. Such a situation can be avoided by the electrical energy supply system 10 according to this embodiment. Moreover, by the electrical energy supply system 10 according to this embodiment, in a case where it is predicted that the electrical energy generation capability of the photovoltaic power generation device 20 is more than the electrical energy consumption amount, the on-vehicle batteries 110 are charged with more electrical energy, so that the electrical energy amount that is fed back to the commercial system 200 can be reduced.

In this embodiment, the plan creation unit 64 predicts the electrical energy amount necessary to charge the on-vehicle battery 110 of each of the electric vehicles 100 to perform the travel schedule, and creates the distribution plan to maximize the number of the electric vehicles 100 whose on-vehicle batteries 110 are charged with an electrical energy amount equal to or more than the predicted necessary electrical energy amount before the scheduled use start time. With such a structure, the number of the electric vehicles 100 that can travel according to the travel schedule with just the electrical energy generated by the photovoltaic power generation device 20 can be maximized.

In this embodiment, the plan creation unit 64 includes the first plan creation unit 64A that creates the distribution plan to charge the on-vehicle battery 110 of each of the electric vehicles 100 in the range of less than or equal to the standard electrical energy storage amount Vs that is smaller than the electrical energy storage amount in the fully-charged state. With such a structure, the electrical energy storage amount of each of the on-vehicle batteries 110 is made smaller than that in the fully-charged state; thus, the deterioration of the on-vehicle batteries 110 can be suppressed.

The electrical energy supply system 10 according to this embodiment further includes the determination unit 64B that determines whether each of the electric vehicles 100 can travel according to the travel schedule when the electrical energy is stored in each of the on-vehicle batteries 110 up to the standard electrical energy storage amount Vs, based on the electrical energy generation amount predicted by the electrical energy generation amount prediction unit 61. The plan creation unit 64 includes the second plan creation unit 64C that creates the distribution plan to charge the electric vehicle 100 whose travel according to the travel schedule is determined to be impossible by the determination unit 64B, with the preliminary electrical energy storage amount Vt that is larger than the standard electrical energy storage amount Vs and enables the electric vehicle 100 to travel according to the travel schedule. With such a structure, the deterioration of the on-vehicle batteries 110 are suppressed in principle and at the same time, if the standard electrical energy storage amount Vs is not enough, setting the preliminary electrical energy storage amount Vt temporarily enables the electric vehicle 100 to travel according to the travel schedule.

In this embodiment, in the case where the predicted atmospheric temperature at the scheduled use start time of each of the electric vehicles 100 is higher than the predetermined reference temperature, the plan creation unit 64 sets the scheduled charge end time for the scheduled use start time so as to be earlier than in the case where the predicted atmospheric temperature is lower than the predetermined reference temperature. With such a structure, when the atmospheric temperature is high, it takes long from the scheduled charge end time to the scheduled use start time for the electric vehicle 100, and for this time, the on-vehicle batteries 110 are cooled. Accordingly, it is possible to suppress that the on-vehicle batteries 110 deteriorate because of having too high temperature.

Other Embodiments

One embodiment of the electrical energy supply system 10 suggested here has been described above. The embodiment described above, however, is just one example and can also be carried out in other modes. For example, in the aforementioned embodiment, the electrical energy generation amount by the photovoltaic power generation device 20 or the electrical energy consumption amount by the travel of the electric vehicle 100 is predicted by the electrical energy supply system 10. However, the electrical energy generation amount by the photovoltaic power generation device 20 or the electrical energy consumption amount by the electric vehicle 100 may be predicted by another system or by a person. A part of the calculation or the control performed by the electrical energy supply system 10 in the aforementioned embodiment may be performed by another system or by a person.

An electrical energy management method disclosed herein is a method of charging on-vehicle batteries of electric vehicles by charging devices connected to a photovoltaic power generation device, and includes an electrical energy generation amount predicting step, a residual amount acquiring step, a travel schedule acquiring step, a plan creating step, and a charging step. In the electrical energy generation amount predicting step, the electrical energy generation amount generated by the photovoltaic power generation device is predicted. In the residual amount acquiring step, the residual electrical energy amount of the on-vehicle battery of each of the electric vehicle is acquired. In the travel schedule acquiring step, the travel schedule of each of the electric vehicles is acquired. In the plan creating step, based on the predicted electrical energy generation amount, the acquired residual electrical energy amount of each of the on-vehicle batteries, and the acquired travel schedule of each of the electric vehicles, a distribution plan for charging the on-vehicle battery of each of the electric vehicle with the electrical energy generated by the photovoltaic power generation device is created. In the charging step, the electric vehicles are charged based on the distribution plan. There is no particular limitation on the subject that performs each of the above steps.

This method may further include an updating step of updating the standard electrical energy storage amount on the basis of a function about the change of the on-vehicle battery over time.

In addition, the embodiment described above will not limit the present disclosure unless otherwise stated in particular. Various changes are possible in the art disclosed herein, and the components and the processes described herein can be omitted as appropriate or combined as appropriate unless any particular problem occurs.

The present specification includes the disclosure according to the items given below.

Item 1:

An electrical energy supply system comprising:

- a photovoltaic power generation device;
- charging devices each of which is connected to the photovoltaic power generation device, is configured to be connectable to an electric vehicle with an on-vehicle battery mounted thereon, and charges the on-vehicle battery of the connected electric vehicle with electrical energy generated by the photovoltaic power generation device;
- an electrical energy generation amount prediction unit that predicts an electrical energy generation amount generated by the photovoltaic power generation device;
- a residual amount acquisition unit that acquires a residual electrical energy amount of the on-vehicle battery in each of the electric vehicles;
- a travel schedule acquisition unit that acquires a travel schedule of each of the electric vehicles;
- a plan creation unit that, based on the electrical energy generation amount predicted by the electrical energy generation amount prediction unit, the residual electrical energy amount of each of the on-vehicle batteries acquired by the residual amount acquisition unit, and the travel schedule of each of the electric vehicles acquired by the travel schedule acquisition unit, creates a distribution plan when the on-vehicle battery of each of the electric vehicles is charged with the electrical energy generated by the photovoltaic power generation device; and a charging control unit that controls the charging devices to charge the electric vehicles based on the distribution plan created by the plan creation unit.

Item 2:

The electrical energy supply system according to Item 1, wherein the plan creation unit predicts an electrical energy amount necessary to charge the on-vehicle battery of each of the electric vehicles to perform the travel schedule, and creates the distribution plan to maximize the number of the electric vehicles whose on-vehicle batteries are charged with an electrical energy amount equal to or more than the predicted necessary electrical energy amount before a scheduled use start time.

Item 3:

The electrical energy supply system according to Item 1 or 2, wherein the plan creation unit includes a first plan creation unit that creates the distribution plan to charge the on-vehicle battery of each of the electric vehicles in a range of less than or equal to a standard electrical energy storage amount that is smaller than an electrical energy storage amount in a fully-charged state.

Item 4:

The electrical energy supply system according to Item 3, further comprising a determination unit that determines whether each of the electric vehicles can travel according to the travel schedule when the electrical energy is stored in each of the on-vehicle batteries up to the standard electrical energy storage amount, based on the electrical energy generation amount predicted by the electrical energy generation amount prediction unit, wherein the plan creation unit includes a second plan creation unit that creates a distribution plan to charge the electric vehicle whose travel according to the travel schedule is determined to be impossible by the determination unit, with a preliminary electrical energy storage amount that is larger than the standard electrical energy storage amount and enables the electric vehicle to travel according to the travel schedule.

Item 5:

The electrical energy supply system according to any one of Items 1 to 4, wherein in a case where a predicted atmospheric temperature at a scheduled use start time of each of the electric vehicles is higher than a predetermined reference temperature, the plan creation unit sets a scheduled charge end time for a scheduled use start time so as to be earlier than in a case where the predicted atmospheric temperature is lower than the predetermined reference temperature.

Item 6:

A non-transient computer-readable medium recording a computer program configured to cause a computer to perform:

ordering charging devices each of which is configured to be connectable to an electric vehicle with an on-vehicle battery mounted thereon and is connected to a photovoltaic power generation device, to charge the on-vehicle battery of the connected electric vehicle with electrical energy generated by the photovoltaic power generation device;

predicting an electrical energy generation amount generated by the photovoltaic power generation device;

acquiring a residual electrical energy amount of the on-vehicle battery in each of the electric vehicles;

acquiring a travel schedule of each of the electric vehicles; and creating a distribution plan when the on-vehicle battery of each of the electric vehicles is charged with the electrical energy generated by the photovoltaic power generation device based on the predicted electrical energy generation amount, the acquired residual electrical energy amount of each of the on-vehicle batteries, and the acquired travel schedule of each of the electric vehicles.

Item 7:

The non-transient computer-readable medium according to Item 6, wherein the creating the distribution plan includes:

predicting an electrical energy amount necessary to charge the on-vehicle battery of each of the electric vehicles to perform the travel schedule; and creating the distribution plan to maximize the number of the electric vehicles whose on-vehicle batteries are charged with an electrical energy amount equal to or more than the predicted necessary electrical energy amount before a scheduled use start time.

Item 8:

The non-transient computer-readable medium according to Item 6 or 7, wherein the creating the distribution plan includes creating the distribution plan to charge the on-vehicle battery of each of the electric vehicles in a range of less than or equal to a standard electrical energy storage amount that is smaller than an electrical energy storage amount in a fully-charged state.

Item 9:

The non-transient computer-readable medium according to Item 8, wherein the computer program is further configured to cause the computer to perform determining whether each of the electric vehicles can travel according to the travel schedule when the electrical energy is stored in each of the on-vehicle batteries up to the standard electrical energy storage amount, based on the predicted electrical energy generation amount; and the creating the distribution plan includes creating a distribution plan to charge the electric vehicle whose travel according to the travel schedule is determined to be impossible, with a preliminary electrical energy storage amount that is larger than the standard electrical energy storage amount and enables the electric vehicle to travel according to the travel schedule.

Item 10:

The non-transient computer-readable medium according to any one of Items 6 to 9, wherein in a case where a predicted atmospheric temperature at a scheduled use start time of each of the electric vehicles is higher than a predetermined reference temperature, a scheduled charge end time for a scheduled use start time is set so as to be earlier than in a case where the predicted atmospheric temperature is lower than the predetermined reference temperature.

Item 11:

A method for charging on-vehicle batteries of electric vehicles by charging devices connected to a photovoltaic power generation device, the method comprising:

predicting an electrical energy generation amount generated by the photovoltaic power generation device;

acquiring a residual electrical energy amount of the on-vehicle battery in each of the electric vehicles;

acquiring a travel schedule of each of the electric vehicles;

creating a distribution plan when the on-vehicle battery of each of the electric vehicles is charged with the electrical energy generated by the photovoltaic power generation device based on the predicted electrical energy generation amount, the acquired residual electrical energy amount of each of the on-vehicle batteries, and the acquired travel schedule of each of the electric vehicles; and charging the electric vehicles, based on the distribution plan.

Item 12:

The method for charging the electric vehicles according to Item 11, wherein the creating the distribution plan includes:

predicting an electrical energy amount necessary to charge the on-vehicle battery of each of the electric vehicles to perform the travel schedule; and creating the distribution plan to maximize the number of the electric vehicles whose on-vehicle batteries are charged with an electrical energy amount equal to or more than the predicted necessary electrical energy amount before a scheduled use start time.

Item 13:

The method for charging the electric vehicles according to Item 11 or 12, further comprising:

setting a standard electrical energy storage amount that is smaller than an electrical energy storage amount in a fully-charged state for the on-vehicle battery of each of the electric vehicles; and determining whether each of the electric vehicles can travel according to the travel schedule when the electrical energy is stored in each of the on-vehicle batteries up to the standard electrical energy storage amount based on the predicted electrical energy generation amount, wherein the creating the distribution plan includes creating the distribution plan in which the electric vehicle that is determined to be able to travel according to the travel schedule is charged with electrical energy that is less than or equal to the standard electrical energy storage amount, and the electric vehicle that is determined to be unable to travel according to the travel schedule is charged with a preliminary electrical energy storage amount that is more than the standard electrical energy storage amount and enables the electric vehicle to travel according to the travel schedule.

Item 14:

The method for charging the electric vehicles according to any one of Items 11 to 13, wherein in a case where a predicted atmospheric temperature at a scheduled use start time of each of the electric vehicles is higher than a predetermined reference temperature, a scheduled charge end time for a scheduled use start time is set so as to be earlier than in a case where the predicted atmospheric temperature is lower than the predetermined reference temperature.

What is claimed is:

1. An electrical energy supply system comprising:

a photovoltaic power generation device;

charging devices each of which is connected to the photovoltaic power generation device, wherein each of the charging devices is configured to be connectable to an electric vehicle having an on-vehicle battery mounted thereon, and charges the on-vehicle battery of the connected electric vehicle with electrical energy generated by the photovoltaic power generation device; and a control device configured to execute a computer program to:

predict an electrical energy generation amount generated by the photovoltaic power generation device;

acquire a residual electrical energy amount of the on-vehicle battery in each of the electric vehicles;

acquire a travel schedule of each of the electric vehicles;

create, based on the predicted electrical energy generation amount, the acquired residual electrical energy amount of each of the on-vehicle batteries, and the acquired travel schedule of each of the electric vehicles, a distribution plan when the on-vehicle battery of each of the electric vehicles is charged with the electrical energy generated by the photovoltaic power generation device; and control the charging devices to charge the electric vehicles based on the created distribution plan-created by the plan creation unit, wherein the control device is further configured to execute the computer program to determine whether each of the electric vehicles can travel according to the travel schedule when the electrical energy is stored in each of the on-vehicle batteries up to a standard electrical energy storage amount that is smaller than an electrical energy storage amount in a fully-charged state, based on the predicted electrical energy generation amount, and wherein creating the distribution plan includes:

creating the distribution plan to charge the on-vehicle battery of each of the electric vehicles in a range of less than or equal to the standard electrical energy storage amount; and creating the distribution plan to charge an electric vehicle whose travel according to the travel schedule is determined to be impossible, with a preliminary electrical energy storage amount that is larger than the standard electrical energy storage amount and enables the electric vehicle to travel according to the travel schedule.

2. The electrical energy supply system according to claim 1, wherein the control device is configured to predict an electrical energy amount necessary to charge the on-vehicle battery of each of the electric vehicles to perform the travel schedule, and create the distribution plan to maximize a number of the electric vehicles whose on-vehicle batteries are charged with an electrical energy amount equal to or more than the predicted necessary electrical energy amount before a scheduled use start time.

3. The electrical energy supply system according to claim 1, wherein in a case where a predicted atmospheric temperature at a scheduled use start time of each of the electric vehicles is higher than a predetermined reference temperature, the control device is configured to set a scheduled charge end time for a scheduled use start time so as to be earlier than in a case where the predicted atmospheric temperature is lower than the predetermined reference temperature.

4. A non-transient computer-readable medium storing a computer program configured to cause a computer to perform:

ordering charging devices each of which is configured to be connectable to an electric vehicle having an on-vehicle battery mounted thereon and is connected to a photovoltaic power generation device, to charge the on-vehicle battery of the connected electric vehicle with electrical energy generated by the photovoltaic power generation device;

predicting an electrical energy generation amount generated by the photovoltaic power generation device;

acquiring a residual electrical energy amount of the on-vehicle battery in each of the electric vehicles;

acquiring a travel schedule of each of the electric vehicles; and creating a distribution plan when the on-vehicle battery of each of the electric vehicles is charged with the electrical energy generated by the photovoltaic power generation device based on the predicted electrical energy generation amount, the acquired residual electrical energy amount of each of the on-vehicle batteries, and the acquired travel schedule of each of the electric vehicles, wherein the computer program is further configured to cause a computer to perform determining whether each of the electric vehicles can travel according to the travel schedule when the electrical energy is stored in each of the on-vehicle batteries up to a standard electrical energy storage amount that is smaller than an electrical energy storage amount in a fully-charged state, based on the predicted electrical energy generation amount, and wherein creating the distribution plan includes:

creating the distribution plan to charge the on-vehicle battery of each of the electric vehicles in a range of less than or equal to the standard electrical energy storage amount, and creating the distribution plan to charge an electric vehicle whose travel according to the travel schedule is determined to be impossible, with a preliminary electrical energy storage amount that is larger than the standard electrical energy storage amount and enables the electric vehicle to travel according to the travel schedule.

5. The non-transient computer-readable medium according to claim 4, wherein the creating the distribution plan includes:

predicting an electrical energy amount necessary to charge the on-vehicle battery of each of the electric vehicles to perform the travel schedule; and creating the distribution plan to maximize the number of the electric vehicles whose on-vehicle batteries are charged with an electrical energy amount equal to or more than the predicted necessary electrical energy amount before a scheduled use start time.

6. The non-transient computer-readable medium according to claim 4, wherein in a case where a predicted atmospheric temperature at a scheduled use start time of each of the electric vehicles is higher than a predetermined reference temperature, a scheduled charge end time for a scheduled use start time is set so as to be earlier than in a case where the predicted atmospheric temperature is lower than the predetermined reference temperature.

7. A method for charging on-vehicle batteries of electric vehicles by charging devices connected to a photovoltaic power generation device, the method comprising:

predicting an electrical energy generation amount generated by the photovoltaic power generation device;

acquiring a residual electrical energy amount of the on-vehicle battery in each of the electric vehicles;

acquiring a travel schedule of each of the electric vehicles;

creating a distribution plan when the on-vehicle battery of each of the electric vehicles is charged with the electrical energy generated by the photovoltaic power generation device based on the predicted electrical energy generation amount, the acquired residual electrical energy amount of each of the on-vehicle batteries, and the acquired travel schedule of each of the electric vehicles; and charging the electric vehicles, based on the distribution plan, wherein the method further comprises:

setting a standard electrical energy storage amount that is smaller than an electrical energy storage amount in a fully-charged state for the on-vehicle battery of each of the electric vehicles; and determining whether each of the electric vehicles can travel according to the travel schedule when the electrical energy is stored in each of the on-vehicle batteries up to the standard electrical energy storage amount based on the predicted electrical energy generation amount, and wherein creating the distribution plan includes:

creating the distribution plan in which the electric vehicle that is determined to be able to travel according to the travel schedule is charged with electrical energy that is less than or equal to the standard electrical energy storage amount, and an electric vehicle that is determined to be unable to travel according to the travel schedule is charged with a preliminary electrical energy storage amount that is more than the standard electrical energy storage amount and enables the electric vehicle to travel according to the travel schedule.

8. The method for charging the electric vehicles according to claim 7, wherein the creating the distribution plan includes:

predicting an electrical energy amount necessary to charge the on-vehicle battery of each of the electric vehicles to perform the travel schedule; and creating the distribution plan to maximize the number of the electric vehicles whose on-vehicle batteries are charged with an electrical energy amount equal to or more than the predicted necessary electrical energy amount before a scheduled use start time.

9. The method for charging the electric vehicles according to claim 7, wherein in a case where a predicted atmospheric temperature at a scheduled use start time of each of the electric vehicles is higher than a predetermined reference temperature, a scheduled charge end time for a scheduled use start time is set so as to be earlier than in a case where the predicted atmospheric temperature is lower than the predetermined reference temperature.

* * * * *